(12) United States Patent
Ohkawachi et al.

(10) Patent No.: US 8,012,570 B2
(45) Date of Patent: Sep. 6, 2011

(54) PRINTING PAPER

(75) Inventors: Ichiro Ohkawachi, Ibaraki (JP); Akira Iwai, Ibaraki (JP); Minoru Kato, Tokyo (JP)

(73) Assignee: Yupo Corporation, Tokyo (JP)

( * ) Notice: Subject to any disclaimer, the term of this patent is extended or adjusted under 35 U.S.C. 154(b) by 991 days.

(21) Appl. No.: 11/662,417

(22) PCT Filed: Sep. 9, 2005

(86) PCT No.: PCT/JP2005/016654
§ 371 (c)(1),
(2), (4) Date: Aug. 20, 2007

(87) PCT Pub. No.: WO2006/028221
PCT Pub. Date: Mar. 6, 2006

(65) Prior Publication Data
US 2007/0298228 A1 Dec. 27, 2007

(30) Foreign Application Priority Data

Sep. 10, 2004 (JP) ................................. 2004-263330
Sep. 10, 2004 (JP) ................................. 2004-263332

(51) Int. Cl.
*B41M 5/00* (2006.01)
*B44C 1/17* (2006.01)
*G03G 7/00* (2006.01)

(52) U.S. Cl. ..................... 428/195.1; 428/200; 428/206; 428/212; 428/323; 428/411.1; 428/480; 428/524; 428/910

(58) Field of Classification Search ............... 428/195.1, 428/200, 206, 212, 323, 411.1, 480, 524, 428/910
See application file for complete search history.

(56) References Cited

U.S. PATENT DOCUMENTS 5,677,055 A * 10/1997 Ohkawachi et al. .......... 428/357
2005/0084637 A1 * 4/2005 Nishizawa et al. .......... 428/35.7

FOREIGN PATENT DOCUMENTS

| EP | 0 497 282 | 8/1992 |
|---|---|---|
| JP | 5-209073 | 8/1993 |
| JP | 9-31228 | 2/1997 |
| JP | 9-208817 | 8/1997 |
| JP | 9-272789 | 10/1997 |
| JP | 9-261164 | 11/1997 |
| JP | 9-291163 | 11/1997 |
| JP | 9-291165 | 11/1997 |
| JP | 10-119227 | 5/1998 |
| JP | 10-202690 | 8/1998 |
| JP | 11-105224 | 4/1999 |
| JP | 11-129426 | 5/1999 |
| JP | 2000-136299 | 5/2000 |
| JP | 2001-49003 | 2/2001 |
| JP | 2001-49004 | 2/2001 |
| JP | 2002-129483 | 5/2002 |
| JP | 2002-194195 | 7/2002 |
| JP | 2002-239642 | 8/2002 |
| JP | 2003-103707 | 4/2003 |
| JP | 2003-220680 | 8/2003 |
| JP | 2003-342404 | 12/2003 |
| JP | 2004-124087 | 4/2004 |
| WO | WO 03/096310 A1 * | 11/2003 |

OTHER PUBLICATIONS $2^{nd}$ Notification of Office Action issued in corresponding Chinese Application No. 200580030497.0, The State Intellectual Property Office of China, Jan. 8, 2010, with its English translation (8 pages).
$3^{rd}$ Notification of Office Action issued in corresponding Chinese Application No. 200580030497.0, The State Intellectual Property Office of China, May 12, 2010, with its English translation (8 pages).

* cited by examiner

*Primary Examiner* — Betelhem Shewareged
(74) *Attorney, Agent, or Firm* — Hamre, Schumann, Mueller & Larson, P.C.

(57) ABSTRACT

This invention provides printing paper which comprises an aliphatic polyester resin utilizing a plant resource-derived biomass material, is excellent, for example, in traveling stability on a printing machine, material strength, reproduction of dots, print sharpness, and waterfastness and is suitable for use in applications where sheet offset printing is carried out, for example, commercial printing applications such as outdoor posters and maps, catalogs, pamphlets, and menues, and a label using the same. The printing paper is a film formed of an aliphatic polyester resin composition comprising 40 to 90% by weight of an aliphatic polyester resin (a) comprising a binary or higher material of aliphatic diol units represented by formula (I) and aliphatic dicarboxylic acid units represented by formula (II) and 60 to 10% by weight of an inorganic fine powder (b). The film has a Gurley stiffness of 50 to 3,000 mg, a surface area S, per projected area 4,292 $\mu m^2$, of the film surface of 5,000 to 50,000 $\mu m^2$, and a convex part volume V, per projected area 4,292 $\mu m^2$, of the film surface of 2,000 to 20,000 $\mu m^3$: —O—$(CH_2)_m$—O— ... (I) wherein m is an integer of 2 to 10; and —CO—$(CH_2)_n$—CO— ... (II) wherein n is an integer of 1 to 12.

28 Claims, No Drawings

PRINTING PAPER

TECHNICAL FIELD

The present invention relates to a printing paper. More specifically, the invention provides a printing paper that is a resin film prepared by melting a resin composition obtained by incorporating fine inorganic powders in an aliphatic polyester resin containing at least an aliphatic diol unit represented by the below-described formula (1) and an aliphatic dicarboxylic acid unit represented by the below-described formula (II) and has excellent sheetfed offset printability; and a label using the printing paper.

[Chemical formula 1]

  (I)

(in the formula (I), m represents an integer of from 2 to 10)

  (II)

(in the formula (II), n represents an integer of from 1 to 12)

BACKGROUND ART

There conventionally have been proposed porous films, each obtained by incorporating fine inorganic powders in a polyolefin resin, melting the resulting mixture into a film, and stretching the film in a uniaxial or biaxial direction. Such porous films are used for various purposes as synthetic paper and are excellent, in particular, in offset printability due to various factors such as running stability on a printer, reproducibility of halftone dots, and adhesion of ink. Compared with natural paper derived from pulp, such synthetic paper has characteristics such as excellent printing sharpness and excellent water resistance so that it is suited for use in commercial printed matters such as outdoor posters, catalogues and maps.

The polyolefin resin serving as a raw material of such synthetic paper is however derived from fossil materials and stable supply of it is not assured in the future. When it is buried without burning after use, it will remain in the soil for a long period of time. Thus, it poses a problem of disposal.

Appearance of a resin film using so-called "Green Pla (R)", plastic mainly making use of a biomass raw material derived from natural resources instead of conventional resins derived from fossil materials has been expected and many reports on it already have been made (Patent Document 1, Patent Document 2, Patent Document 3, Patent Document 4, Patent Document 5, Patent Document 6, Patent Document 7, Patent Document 8, Patent Document 9, Patent Document 10, Patent Document 11, Patent Document 12, Patent Document 13, Patent Document 14, Patent Document 15 and Patent Document 16). A printing paper usable in sheetfed offset printing must have no picking, have water resistance, have size stability, have less paper habit, have adequate wettability with water, have good ink adhesion, drying property and ink set, have adequate resilience (stiffness), have running stability on a printer, and have good reproducibility of halftone dots. Thus, it must satisfy many property demands. Films satisfying the above-described quality demands have not yet appeared.

A resin film using a homopolymer of an oxycarboxylic acid (so-called polylactic acid or the like) described in the above patent documents is fragile owing to a high modulus of elasticity of the resin and therefore easily breaks when a tension is applied. Compared with natural paper or polyolefin-based synthetic paper which is adequately soft and has flexibility, the above-described film is inferior in running stability on a printer in sheetfed offset printing, which severely squeezes the film on its path (such as between rollers/blankets) or in web offset printing •gravure printing in which a high tension is applied to the film between rollers.

A resin film having excellent strength and modulus of elasticity (flexibility) comparable to those of a polyolefin resin is available from an aliphatic polyester resin containing an aliphatic diol and aliphatic dicarboxylic acid other than a homopolymer of an oxycarboxylic acid, but the printing paper (Patent Document 4) does not seem to have a sufficient opacity necessary for printing sharpness owing to a small content of fine inorganic powders; or on the contrary, the printing paper (Patent Document 6) having an excessively high content of fine inorganic powders and having too many voids formed therein is only described in Examples. None is well suited as a printing paper. The former one has poor appearance as paper and is inferior in printing sharpness, while the latter one does not function as synthetic paper usable in actual printing on a printer because lack of resilience leads to appearance of wrinkles during running or low substrate strength leads to appearance of picking (picking, deprival of ink during printing).

In addition, laminate paper obtained by laminating an aliphatic polyester resin on both sides of natural paper and excellent in printability is disclosed (Patent Document 17). Natural paper at the cross-section of this laminate paper absorbs water, which causes peeling of the thin resin film from the natural paper serving as a substrate or unevenness and this laminate paper does not have sufficient water resistance suited for use in outside posters or the like. In addition, unevenness of the fibers of natural paper constituting the center layer appears as surface roughness so that it is inferior in halftone dot reproducibility during printing compared with synthetic paper, which makes the print image blurry. This paper is therefore not suited for high definition printing.

Patent Document No. 1: JP-A-05-209073
Patent Document No. 2: JP-A-09-031228
Patent Document No. 3: JP-A-09-208817
Patent Document No. 4: JP-A-09-272789
Patent Document No. 5: JP-A-09-291163
Patent Document No. 6: JP-A-09-291164
Patent Document No. 7: JP-A-09-291165
Patent Document No. 8: JP-A-10-119227
Patent Document No. 9: JP-A-10-202690
Patent Document No. 10: JP-A-11-105224
Patent Document No. 11: JP-A-11-129426
Patent Document No. 12: JP-A-2000-136299
Patent Document No. 13: JP-A-2001-049003
Patent Document No. 14: JP-A-2001-049004
Patent Document No. 15: JP-A-2002-194195
Patent Document No. 16: JP-A-2003-342404
Patent Document No. 17: JP-A-2003-220680

DISCLOSURE OF THE INVENTION

Problems that the Invention is to Solve

Synthetic paper which is a resin film made of a resin composition containing an aliphatic polyester resin using mainly raw materials derived from plants and excellent in printability and water resistance, particularly, sheetfed offset printing paper must have performances such as running stability on a printer, substrate strength and reproducibility of halftone dots as described above. It must have, more specifically, adequate resilience (stiffness) and surface roughness.

A printing paper having inadequate resilience (stiffness) does not have good running stability on a printer. A printing paper having too low resilience poses problems such as deflection of paper at the paper feed portion of a printer or misfeeding of paper such as multifeeding and in addition, printed matters tend to have wrinkles. A printing paper having too high resilience, on the other hand, cannot be used practically because of impossibility of even passage through the running portion or printing only at a low speed.

A printing paper has deteriorated halftone dot reproducibility in printing and running stability on a printer unless it has adequate surface roughness. A printing paper having an excessively rough surface is not suited for high resolution printing because thickening of halftone dots (dot gain) tends to occur. A printing paper having a too smooth surface, on the other hand, has a problem in running stability on a printer because a plurality of sheets of paper do not easily separate from each other and misfeeding such as multifeeding occurs.

Means for Solving the Problems

The present inventors have carried out an extensive investigation on a printing paper that is a film made of an aliphatic polyester film and is used for printing and completed the present invention.

In the present invention, there are thus provided:

1. A printing paper, that comprises an aliphatic polyester resin composition comprising: (a) from 40 to 90 wt. % of an aliphatic polyester resin containing at least an aliphatic diol unit represented by the following formula (I) and an aliphatic dicarboxylic acid unit represented by the following formula (II); and (b) from 60 to 10 wt. % of fine inorganic powders, wherein the printing paper has a Gurley stiffness of from 50 to 3,000 mg, a surface area S of from 5,000 to 50,000 μm² per 4,292 μm² of a projected area on the surface of the printing paper, and a volume V, at a convex portion on the surface of the printing paper, of from 2,000 to 20,000 μm³ per 4,292 μm² of a projected area on the surface of the printing paper.

[Chemical formula 2]

$$—O—(CH_2)_n—O—\qquad (I)$$

(in the formula (I), m represents an integer of from 2 to 10)

$$—CO—(CH_2)_n—CO—\qquad (II)$$

(in the formula (II), n represents an integer of from 1 to 12)

2. The printing paper as described above in 1, wherein the aliphatic polyester resin (a) further comprises an aliphatic oxycarboxylic acid unit represented by the following formula (III):

[Chemical formula 3]

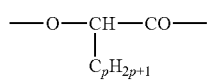

(in the formula (III), p represents 0 or an integer of from 1 to 10).

3. The printing paper as described above in 1 or 2, wherein the aliphatic polyester resin (a) comprises from 38.5 to 50 mole % of the aliphatic diol unit represented by the formula (I), from 38.5 to 50 mole % of the aliphatic dicarboxylic acid unit represented by the formula (II), and from 0 to 23 mole % of the aliphatic oxycarboxylic acid unit represented by the formula (III), and has a number average molecular weight of from 10000 to 500000.

4. The printing paper as described above in any one of 1 to 3, wherein the aliphatic diol contains 1,4-butanediol and the aliphatic dicarboxylic acid contains at least one of succinic acid and adipic acid.

5. The printing paper as described above in any one of 2 to 4, wherein the aliphatic oxycarboxylic acid contains lactic acid.

6. The printing paper as described above in any one of 1 to 5, wherein the fine inorganic powders (b) contain at least one selected from talc, calcium carbonate and titanium oxide.

7. The printing paper as described above in any one of 1 to 6, which comprises an unstretched film comprising an aliphatic polyester resin composition.

8. The printing paper as described above in any one of 1 to 7, which comprises a uniaxially stretched film comprising an aliphatic polyester resin composition.

9. The printing paper as described above in any one of 1 to 8, which comprises a biaxially stretched film comprising an aliphatic polyester resin composition.

10. The printing paper as described above in any one of 1 to 9, which can be printed stably at a printing speed of from 3,000 to 12,000 sheets/hour in sheetfed offset printing.

11. The printing paper as described above in any one of 1 to 10, wherein a thickening ratio (dot gain) of a 50% halftone dot portion in the offset printing matter, falls within a range of from 15 to 25%.

12. The printing paper as described above in any one of 1 to 11, which is free from picking in the printing matter.

13. The printing paper as described above in any one of 1 to 12, which has, on the surface thereof, a surface strength of 1.5 kg·cm or greater.

14. The printing paper as described above in any one of 1 to 13, which has an opacity of 85% or greater.

15. The printing paper as described above in any one of 1 to 14, which includes a stretched film having a void ratio, represented by the following formula (IV), of from 5 to 60%:

Equation 1

$$\text{Void ratio }(\%)=[(\rho_0-\rho)/\rho_0]\times 100 \qquad (IV)$$

(in the formula (IV), $\rho_0$ represents the density of a film before stretching, while $\rho$ represents the density of a film after stretching).

16. A label having an adhesive layer disposed on at least one side of the printing paper as described in any one of 1 to 15.

17. A printed matter, which comprises the printing paper as described above in any one of 1 to 15 or a label as described above in 16.

Advantage of the Invention

A printing paper according to the present invention uses an aliphatic polyester resin, which can be made of biomass raw materials derived from plant resources. It is excellent in running stability on a printer, substrate strength, reproducibility of halftone dots, printing sharpness, and water resistance so that it is well suited for use in commercial printing to which sheetfed/surface printing can be applied such as outside posters, maps, catalogues, menus and pamphlets. It is also suited for use in labels to which printing is applied.

BEST MODE FOR CARRYING OUT THE INVENTION

The present invention will hereinafter be described more specifically.

(Aliphatic Polyester Resin)

The aliphatic polyester resin in the present invention has, as reaction main components, an aliphatic diol or derivative thereof and an aliphatic dicarboxylic acid or derivative thereof and is obtained by the polymerization reaction of them in a substantially equimolar amount. Preferably, it has, as main reaction components, an aliphatic diol or derivative thereof and an aliphatic dicarboxylic acid or derivative thereof and is obtained by copolymerization of them in the presence of from 0.04 to 60 moles of an aliphatic oxycarboxylic acid relative to 100 moles of the aliphatic dicarboxylic acid or derivative thereof. More preferably, it is an aliphatic polyester resin having a number average molecular weight of from 10000 to 500000, which resin is obtained by the polycondensation reaction of an aliphatic or alicyclic diol or derivative thereof and an aliphatic or alicyclic dicarboxylic acid or derivative thereof in the presence of from 0.04 to 60 moles, relative to 100 moles of the aliphatic dicarboxylic acid or derivative thereof, of an α-hydroxycarboxylic acid type aliphatic oxycarboxylic acid typified by lactic acid while using a germanium compound as a catalyst.

Such an aliphatic polyester resin has, different from a homopolymer (so-called polylactic acid or the like) of an oxycarboxylic acid, such an advantage that a ratio of alkylene chains in a polymer chain can be set as desired, depending on the kind, combination or mixing ratio of an aliphatic diol and aliphatic dicarboxylic acid to be used for the reaction. It is possible to obtain an aliphatic polyester resin having physical properties (modulus of elasticity, tensile elongation and the like) close to those of polyolefin resins.

An aliphatic polyester having a high molecular weight is available by carrying out polycondensation reaction in the presence of a catalyst made of a germanium compound and using an adequate amount of an aliphatic oxycarboxylic acid such as lactic acid, thereby raising the polymerization rate. The aliphatic polyester resin in the present invention has an aliphatic diol or derivative thereof and an aliphatic dicarboxylic acid or derivative thereof as main reaction components and thus is made of binary or multi-component raw materials. It does not include a unitary aliphatic polyester resin available by the polycondensation of an aliphatic oxycarboxylic acid such as polylactic acid or that available by the ring-opening polymerization of lactone. Such an aliphatic polyester made of a multi-component raw material has, owing to the alkylene chain in the molecule thereof, physical properties (such as tensile elongation at break and modulus of elasticity) close to those of a polyolefin resin, can be molded easily or formed into a resin film, and provides the resulting printing paper with excellent running property on a printer.

As the aliphatic diol, aliphatic diols corresponding to the formula: HO—$(CH_2)_m$—OH (in which, m represents an integer of from 2 to 10) are preferred.

Specific examples include ethylene glycol, 1,3-propanediol, 1,4-butanediol, 1,5-pentanediol, 1,6-hexanediol, 1,8-octanediol, decamethylene glycol, and neopentyl glycol. Aliphatic diols which are alicyclic such as 1,4-cyclohexanedimethanol also may be usable. These aliphatic diols may be used either singly or in combination of two or more of them. In consideration of the properties of a resin thus obtained, 1,4-butanediol or ethylene glycol is preferred, with 1,4-butanediol being especially preferred.

As the aliphatic dicarboxylic acid, aliphatic dicarboxylic acids corresponding to HOOC—$(CH_2)_n$—COOH (in which n represents an integer of from 1 to 12) are preferred.

Specific examples include oxalic acid, malonic acid, succinic acid, glutaric acid, adipic acid, pimelic acid, suberic acid, azelaic acid, sebacic acid, undecadicarboxylic acid and dodecadicarboxylic acid; aliphatic dicarboxylic acids which are cyclic such as hexahydrophthalic acid, hexahydroisophtahlic acid and hexahydroterephthalic acid; and derivatives thereof such as lower alkyl esters, and acid anhydrides such as succinic anhydride and adipic anhydride. These dicarboxylic acids (and derivatives thereof) may be used either singly or in combination of two or more of them. In consideration of the properties of the polymer thus obtained, aliphatic dicarboxylic acids having an alkylene chain with from about 1 to 4 carbon atoms as n are preferred, of which succinic acid, succinic anhydride and a mixture of succinic acid with adipic acid are especially preferred.

As the aliphatic oxycarboxylic acid, aliphatic α-hydroxycarboxylic acids corresponding to the below-described structural formula are preferred.

[Chemical formula 4]

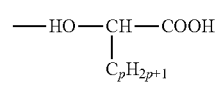

(in the formula, p represents 0 or an integer of from 1 to 10).

Specific examples of the aliphatic oxycarboxylic acid include lactic acid, glycolic acid, 2-hydroxy-n-butyric acid, 2-hydroxy-3-methyl-n-butyric acid, 2-hydroxy-3,3-dimethyl-n-butyric acid, 3-hydroxy-n-butyric acid, 4-hydroxy-n-butyric acid, 2-hydroxycaproic acid, 2-hydroxy-3,3-dimethylbutyric acid, 2-hydroxy-n-valeric acid, 3-hydroxy-n-valeric acid, 4-hydroxy-n-valeric acid, 5-hydroxy-n-valeric acid, 2-hydroxy-n-hexanoic acid, 2-hydroxy-1-hexanoic acid, 3-hydroxy-n-hexanoic acid, and 4-hydroxy-n-hexanoic acid, and mixtures thereof. These aliphatic oxycarboxylic acids may be, if having an enantiomer, in any one of the D form, L form and racemic form. They may be a solid, liquid or aqueous solution. Of these, lactic acid or an aqueous lactic acid solution is especially preferred because it is easily available.

The aliphatic diols, aliphatic dicarboxylic acids and aliphatic oxycarboxylic acids in the present invention are preferably those that can be prepared using a biomass raw material such as sugar or starch as a starting substance.

No particular limitation is imposed on the preparation process of the aliphatic polyester resin that will be a raw material of the resin film of the present invention and it can be prepared in a conventionally known manner. It can be prepared, for example, by melting polycondensation as described in JP-A-08-239461 or by dehydration polycondensation in an organic solvent. Polycondensation conditions to be employed for the preparation of the aliphatic polyester resin are not particularly limited and polycondensation can be performed under conventionally employed appropriate ones. Although the aliphatic diol is added in a substantially equimolar amount to 100 moles of the aliphatic dicarboxylic acid or derivative thereof, it usually is added in excess of from 1 to 20 mole % in consideration of the distillation during ring esterification.

An excess amount of the aliphatic oxycarboxylic acid may tend to lead to insufficient heat resistance and mechanical properties, while too small an amount of it tends to prepare a polycondensate having a low molecular weight. The aliphatic oxycarboxylic acid is added in an amount of from 0 to 60 moles, preferably from 0.04 to 60 moles, more preferably from 1 to 40 moles, especially preferably from 2 to 20 moles relative to 100 moles of the aliphatic dicarboxylic acid or derivative thereof. No particular limitation is imposed on the adding time or method of the aliphatic oxycarboxylic acid as long as it is before the initiation of the polycondensation.

Examples include (1) addition of the aliphatic oxycarboxylic acid as a solution having a catalyst dissolved therein in advance, and (2) addition of the aliphatic oxycarboxylic acid simultaneously with a catalyst at the charging time of raw materials.

The aliphatic polyester resin preferably is obtained by the polycondesation of the above-described raw materials in the presence of a polymerization catalyst made of a germanium compound. Examples of the germanium compound include organic germanium compounds such as tetraalkoxygermanium and inorganic germanium compounds such as germanium oxide and germanium chloride. Germanium oxide, tetraethoxygermanium and tetrabutoxygermanium are especially preferred from the standpoints of price and availability. The germanium compounds may be used either singly or as a mixture of two or more of them. The germanium compound may be used in combination with another catalyst usable for the preparation of the polyester resin. The catalyst usable in combination with the germanium compound is a metal catalyst soluble in the reaction system and examples include compounds such as titanium, antimony, tin, magnesium, calcium and zinc.

These catalysts are used in an amount of from 0.001 to 3 wt. %, more preferably from 0.005 to 1.5 wt. %, relative to the amount of monomers used in the polycondensation reaction. Although no particular limitation is imposed on the adding time of the catalyst insofar as it is before the initiation of the polycondensation, addition at the charging time of raw materials or addition as a solution of the catalyst in an aqueous solution of the aliphatic oxycarboxylic acid is preferred. From the viewpoint of the storage property of the catalyst, addition of it as a solution in the aliphatic oxycarboxylic acid is preferred.

Conditions for the preparation of the aliphatic polyester resin such as temperature, time, and pressure vary, depending on the combination of raw material monomers, proportion of them, and kind or amount of the catalyst. The temperature is selected preferably from a range of from 150 to 260° C., more preferably from a range of from 180 to 230° C. The polymerization time is selected preferably from a range of from 2 hours or greater, more preferably from 4 to 15 hours. The reaction pressure is conducted under reduced pressure preferably at 10 mmHg or less, more preferably 2 mmHg or less.

With regard to the composition ratio of the aliphatic polyester resin, it is preferred that the molar ratio of the aliphatic diol unit represented by the formula (I) and the molar ratio of the aliphatic dicarboxylic acid unit represented by the formula (II) are substantially equal. The aliphatic diol unit represented by the formula (I) and the aliphatic dicarboxylic acid unit represented by the formula (II) each are selected preferably from a range of from 38.5 to 50 mole %, more preferably from a range of from 38.5 to 49.99 mole %, still more preferably from a range of from 41.5 to 49.75 mole %, especially preferably from 45.5 to 49.5 mole %. The aliphatic oxycarboxylic acid unit represented by the formula (III) is selected preferably from 0 to 23 mole %, more preferably from 0.02 to 23 mole %, still more preferably from 0.5 to 17 mole %, especially preferably from 1 to 9%. Amounts of the aliphatic oxycarboxylic acid exceeding 23 mole % lead to insufficient heat resistance and mechanical properties.

Another copolymer component can be introduced into the aliphatic polyester resin as long as it does not impair the object or advantage of the present invention. Examples of the another copolymer component include polyoxycarboxylic acids, polycarboxylic acids and polyols having at least three functional groups. Introduction of such another copolymer component is preferred because it can enhance the melt viscosity of the aliphatic polyester resin. Specific examples of the another copolymer component include malic acid, tartaric acid, citric acid, trimethylolpropane, glycerin, pentaerythritol, trimellitic acid and pyromellitic acid. Of these, malic acid, trimethylolpropane and glycerin are particularly preferred from the standpoint of the physical properties of the aliphatic polyester resin obtained using it.

The number average molecular weight (as measured by GPC and indicated relative to polystyrene standards) of the aliphatic polyester resin ranges from 10000 to 500000, preferably from 30000 to 200000. When the number average molecular weight is less than 10000, a printing paper cannot have sufficient mechanical strength, while that exceeding 500000 disturbs smooth molding or formation. The number average molecular weight outside the above-described range is therefore not preferred.

The melting point of the aliphatic polyester resin ranges from 70 to 180° C. The resin having a melting point less than 70° C. has insufficient heat resistance, while the resin having a melting point exceeding 180° C. cannot be prepared easily. Of the above-described range, the melting point is preferably from 70 to 150° C., more preferably from 80 to 135° C. Moreover, MFR (as measured in accordance with JIS-K-7210) at 190° C. preferably ranges from 0.01 to 50 g/10 minutes.

When a resin film is formed, a resin content constituting the aliphatic polyester resin composition may be a mixture with a thermoplastic resin other than the aliphatic polyester resin, for example, a polyolefin resin for the purpose of improving the formability. When a resin derived from a fossil raw material is mixed, its content in the resin is adjusted preferably to less than 50 wt. % to meet the object of the present invention. When two or more resins are added and used as a mixture and they have however poor compatibility, a compatibilizing agent may be added thereto.

(Fine Inorganic Powders)

In the present invention, fine inorganic powders incorporated as a raw material function as a filler (pigment) or a void forming material, or in some cases, as a nucleating agent. It is added in order to give whiteness or opacity, which synthetic paper must have, to a resin film. Examples include calcium carbonate, talc, calcined clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, asbestos powder, Shirasu balloons, zeolite and montmorillonite. Of these, calcium carbonate, talc, clay, barium sulfate and titanium oxide are preferred. They may be used either singly or in combination of two or more of them.

The fine inorganic powders have an average particle size of preferably 30 μm or less, more preferably 10 μm or less, most preferably from 0.2 to 5 μm. Too large particle size is not preferred because appearance is influenced by the shape of powders, or it tends to cause coarse irregularities on the surface of a stretched film owing to the deterioration in denseness of voids and makes it difficult to accomplish printing sharpness. The fine inorganic powders having a too small particle size, on the other hand, are not preferred because of poor dispersibility in the resin composition and inferior formability. When the particle size of the fine inorganic powders is too small, voids are sometimes not formed easily in a stretched film. The fine inorganic powders may be surface treated from the viewpoint of dispersibility in the resin composition or stretchability. As the surface treatment, they are treated preferably with a fatty acid or a metal salt thereof.

(Composition)

The fine inorganic powders to be incorporated in the raw material resin composition is selected from a range of from 10 to 60 wt. % relative to 100 wt. % of the resin composition. When the amount of the fine inorganic powders is less than 10 wt. %, the resulting film has a low opacity. Even if the film is stretched, the film cannot have a desired void ratio because a sufficient number of voids are not formed therein. As a result, the film has, similar to an unstretched film, a low opacity and cannot easily provide printing sharpness. Amounts of the fine inorganic powders exceeding 60 wt. %, on the other hand, lead to an inferior kneading property of the resin composition and inferior film formability. In the case of a stretched film, they cause lowering in the surface strength and become a cause for picking (which will be described later). Amounts of the fine inorganic powders outside the above-described range are therefore not preferred. The amount of the fine inorganic powders preferably ranges from 12 to 55 wt. %, especially preferably from 15 to 50 wt. %.

(Optional Components)

Another resin additive can be added to the resin composition of the present invention to an extent not impairing the object or advantage of the present invention. Examples of the another resin additive include plasticizers, heat stabilizers, antioxidants, ultraviolet absorbers, dyes, pigments, antioxidants, fluorescence agents, lubricants, flame retardants and nucleating agents.

Examples of the plasticizer to be incorporated in the resin composition include esterified products of dipentaerythritol, hydrogenated products of polybutadiene and epoxidized soybean oil. They may be used either singly or in combination of two or more of them. The plasticizer is added in an amount ranging from 0 to 50 parts by weight, preferably from 3 to 20 parts by weight, based on 100 parts by weight of the raw material resin.

In order to obtain a resin composition by adding, to the raw material resin, fine inorganic powders and resin additives, it is only necessary to weigh predetermined amounts of necessary components, charging them in a mixer, and stirring and mixing them sufficiently to disperse them uniformly. Examples of the mixer usable here include drum, tumbler mixer, ribbon blender, Henschel mixer, and super mixer. Of these, high-speed stirring type mixers such as Henschel mixer and super mixer are preferred.

The resin composition prepared in the above-described manner then is melt-kneaded, pelletized and then formed into a resin film or the resin composition can be formed directly into a resin film while melt-kneading. For the melt-kneading of the resin composition, use of a conventionally known melt-kneading apparatus such as screw extruder, twin-screw extruder, mixing roll, Banbury mixer and twin-screw kneader is recommended.

(Manufacture of Printing Paper (Resin Film))

Printing paper of the present invention can be manufactured by combining various methods well known to those skilled in the art. Any printing paper manufactured by any method can be embraced in the scope of the present invention as long as it satisfies the conditions of the present invention.

The printing paper of the present invention can be manufactured by melting the aliphatic polyester resin composition prepared by the above-described manner and then forming it into a film. Various known film forming techniques and combinations thereof can be used. Examples include a cast forming method in which a molten resin is extruded into a sheet through a single-layer or multilayer T die connected to a screw type extruder, a stretching film method in which void generation by stretching is utilized, a calendering method or calender forming method in which voids are generated during calendering, a foaming method using a foaming agent, a method of using void-containing particles, an inflation method using a circular die, a solvent extraction method, and a method of dissolving and extracting mixed components. Of these methods, a cast forming method, which can facilitate continuous processing such as stretching, is preferred.

The printing paper of the present invention may have a single layer structure or may be a laminate film having a multilayer structure in which two or more layers have been stacked. Examples of the laminate film forming method include a method of melting a plurality of raw material resins through a plurality of extruders, and stacking a plurality of layers in a coextrusion die; a method of forming one of the raw material resins into a film and laminating thereon, under a molten state, another film obtained by extruding another raw material resin, which has been melted in another extruder, and a method of dry laminating a plurality of films that have been prepared in advance; and combination of them. Any of these methods can be employed. In this case, in addition to the various aliphatic polyester resin compositions so far described, resin raw materials such as other thermoplastic resins, fine inorganic powders and optional components can be adopted while changing their mixing ratio. However, use of the aliphatic polyester resin composition of the present invention as at least the resin raw material constituting the outermost layer is preferred, with use of it as the resin raw material of all the layers being more preferred.

The resin film constituting the printing paper of the present invention may be either stretched or unstretched and the number of stretching directions is not particularly limited as long as it satisfies the physical properties that will be described later. The resin film may be any of an unstretched film, uniaxially stretched film, biaxially stretched film, and combination thereof. For example, the resin film may be an unstretched film having a monolayer structure or a film having a multilayer structure obtained by stacking a uniaxially stretched film and a biaxially stretched film one after another.

Relatively thick printing paper can be provided using an unstretched resin film. Owing to a low shrinkage ratio and high substrate strength, this paper has merits such as resistance to picking (picking, deprival of ink during printing).

The unstretched resin film according to the present invention can be made opaque by incorporating fine inorganic powders in the aliphatic polyester resin. The film thus obtained has a density of from 1.3 to 2.2 $g/cm^3$, preferably from 1.35 to 2.1 $g/cm^3$, especially preferably from 1.4 to 1.9 $g/cm^3$. The film having a density less than 1.3 $g/cm^3$ is not easily available in consideration of the raw materials to be mixed, while that having a density exceeding 2.2 $g/cm^3$ becomes too heavy to handle. Densities outside the above-described range are therefore not preferred.

Use of the stretched film as the printing paper of the present invention is effective for density reduction, weight reduction, opacification, and improvement in cushioning properties (compression recovery ratio), which are brought about by microvoids generated inside or on the surface of the film. In addition, it contributes to the adjustment of resilience (stiffness), homogenization of thickness, and reduction of uneven thickness, which are brought about by the stretching orientation of the resin. It however offers not only the above-described advantages but also disadvantages such as lowering in the substrate strength and increase in the shrinkage ratio.

Various known methods are employed for the stretching of the resin film of the present invention. Specific examples include machine direction stretching making use of a difference in peripheral velocities of rolls, transverse direction stretching using a tenter oven, calendering, inflation stretching using a mandrel for a tubular film, and coincident biaxial stretching using a tenter oven and a linear motor in combination. The stretching may be either one-stage stretching or multi-stage stretching.

Temperature at the time of stretching an unstretched film is preferably selected from temperatures not greater than the melting point of the resin composition, more preferably from a temperature range from 1 to 100° C. lower than the melting point of the aliphatic polyester resin to be employed. Temperatures lower than the melting point by more than 100° C. tend to cause stretching unevenness or stretching break during stretching of the film because too high a tension stress is applied during stretching. At temperatures higher than 1° C. lower than the melting point, on the other hand, a desired void ratio cannot be attained. Temperatures outside the above-described range are therefore not preferred. A draw ratio is not particularly limited and it is determined as needed after consideration of the required quality of the printing paper of the present invention and properties of the thermoplastic resin to be used. For example, a draw ratio is selected preferably from a range of from 1.2 to 8, preferably from 1.5 to 6, especially preferably from 2 to 5 in a uniaxial direction. When the draw ratio is less than 1.2, a desired void ratio cannot be attained because of insufficient stretching effects and unsatisfactory porous property and tension of the film. Draw ratios exceeding 8, on the other hand, force the excessive molecular orientation of the stretched film in the stretching direction, which tends to cause deterioration in the strength of the film or stretching break. Draw ratios outside the above-described range are therefore not preferred.

The area draw ratio, that is, a draw ratio in the biaxial direction, is selected preferably from 1.5 to 8, more preferably from 3 to 70, especially preferably from 4 to 10. When the draw ratio is less than 1.5, a desired void ratio cannot easily be attained, while when the draw ratio exceeds 80, the stretching break tends to occur. Area draw ratios outside the above-described range are therefore not preferred.

The stretched resin film relating to the present invention can have a decreased density and be made opaque by stretching the aliphatic polyester resin containing fine inorganic powders, thereby generating microvoids inside or on the surface of the film. The resin film thus obtained has a density of from 0.6 to 1.4 g/cm$^3$, preferably from 0.7 to 1.3 g/cm$^3$, especially preferably from 0.75 to 1.0 g/cm$^3$.

The film after formation, similar to ordinary thermoplastic resin films, may be subjected to post treatment such as heat treatment (annealing), corona discharge treatment or flame treatment.

(Physical Properties of Printing Paper (Resin Film))

The resin film thus obtained must satisfy the below-described physical properties as the printing paper of the present invention.

(Resilience (Gurley Stiffness))

The resilience of the printing paper of the present invention, in terms of Gurley stiffness, falls within a range of from 50 to 3000 mg in both directions of MD (machine direction) and TD (transverse direction). It falls preferably within a range of from 75 to 200 mg in both directions of MD and TD. It falls especially preferably within a range of from 100 to 1500 mg in both directions of MD and TD. In general, stiffness is a property determined depending on the thickness factor of a substrate. The above-described range is determined in consideration of a thickness factor which is limited by a printer. The printing paper has for example a thickness of from 80 to 500 μm, preferably from 100 to 480 μm, especially preferably from 120 to 400 μm.

When the printing paper has a Gurley stiffness falling within the above-described range, stable running property on a printer without troubles can be ensured.

When the Gurley stiffness is below 50 mg in either one of MD and TD, problems such as distortion of paper at the feed portion of a printer and misfeeding such as multifeeding occur. The printed matter tends to have wrinkles. When the Gurley stiffness exceeds 3000 mg, on the other hand, paper runs violently without following the movement of the printer at the running portion thereof, which disturbs paper feeding or only permits printing at a low speed. If it leads to paper jam, the blanket is broken so that such paper cannot be used in practice.

The printing paper having a Gurley stiffness within the above-described range in each of MD and TD widens the freedom in imposition upon printing and thereby improves the practice upon printing.

[Surface Roughness]

The resin film of the present invention has, as printing paper, a surface area S of from 5,000 to 50,000 μm$^2$ per 4,292 μm$^2$ of a projected area, and at the same time has a volume V, at the convex portion on the surface of the film, of from 2,000 to 20,000 μm$^3$ per 4,292 μm$^2$ of a projected area. In the present invention, the surface roughness of the resin film is observed not by a conventional contact type three-dimensional roughness meter using a probe but by a non-contact type ultra-deep profile microscope using laser light.

There conventionally has been an attempt to explain the printing quality of printing paper by using parameters such as arithmetic average roughness (Ra), maximum height (Rv) and peak count (Pc) as determined by a contact-type three dimensional roughness meter using a probe. It however fails to provide a sufficient correlation.

The failure is presumed to occur because the resolution of the conventional contact type three-dimensional roughness meter using a probe depends on the top diameter (about 2 μm) of the probe so that very fine irregularities attributable to fine inorganic powders smaller than 2 μm cannot be observed and the surface roughness thus measured is inevitably imprecise. A non-contact type ultra-deep profile microscope using laser light can observe the surface roughness at a resolution of about 0.3 μm without destroying a sample, though this depends on the wavelength of the laser light or lens diaphragm. It conforms to the order of the particle size of the fine inorganic powders to be incorporated so that high correlation can be obtained between the measurement results and print quality of the printing paper.

The resin film, as the printing paper of the present invention, has a surface area S, per 4,292 μm$^2$ of a projected area, of from 5,000 to 50,000 μm$^2$. At the same time, it has a volume V, at a convex portion thereof, of from 2,000 to 20,000 μm$^3$ per 4,292 μm$^2$ of a projected area. It is preferred that the surface area S is from 8,000 to 40,000 μm$^3$ and the volume V at a convex portion ranges from 4,000 to 15,000 μm$^3$. It is especially preferred that the surface area S is from 10,000 to 30,000 μm$^2$ and the volume V at a convex portion ranges from 5,000 to 10,000 μm$^3$.

The resin film having a surface area S below 5,000 μm$^2$ has a highly flat surface without irregularities on the whole surface so that owing to deteriorated lubrication between resin films, misfeeding such as multifeeding tends to occur. In addition, such a film has poor ink adhesion because it does not have sufficient tackiness. The resin film having an excessively large surface area S exceeding 50,000 μm$^2$, on the other hand, is rough over the whole surface with many irregularities and tends to have a decreased surface strength.

When the resin film has a volume V, at a convex portion thereof, below 2,000 μm$^3$, it has irregularities that are not so deep or high and has therefore a highly smooth surface. This disturbs smooth separation between resin films and paper feeding or ejection troubles such as multifeeding also become a problem. When the resin film has a volume V, at a convex portion thereof, exceeding 20,000 μm$^3$, on the other hand, its surface becomes too coarse with excessively large irregularities so that thickening of halftone dots (dot gain) tends to occur, which deteriorates the halftone dot reproducibility of the print. The resin film having a volume V outside the above-described range is therefore not suited for high resolution printing.

[Opacity]

From the standpoint of sharpness of a printed matter, the printing paper of the present invention has an opacity of preferably 85% or greater, more preferably from 90 to 100%, still more preferably from 95 to 100%, especially preferably from 97 to 100%.

[Void Ratio]

When the resin film of the present invention is stretched, many microvoids can be disposed inside and on the surface of the resin film with fine inorganic powders as nuclei. The resin film has preferably a void ratio, represented by the below-described equation (I), of from 5 to 60%, more preferably from 10 to 55%, especially preferably from 20 to 50%.

$$\text{Void ratio (\%)} = [(\rho_0 - \rho)/\rho_0] \times 100 \tag{I}$$

(in the equation (I), $\rho_0$ represents the density of a film before stretching, while $\rho$ represents the density of a film after stretching).

When the film has a void ratio below 5%, an ink density on the printed surface is not sufficient owing to the inferiority in opacity or whiteness and a low compression recovery ratio so that it tends to fail to provide printing sharpness. When the film has a void ratio exceeding 60%, on the other hand, the strength of the substrate lowers and problems such as picking (paper picking, deprival of ink at the color overlapped portion during multicolor printing) or edge picking (ink deprival at the end portion of the print) may occur. The printing paper has a surface strength of preferably 1.5 kg·cm or greater as a substrate strength for preventing picking.

(Printing)

The printing paper thus obtained is suited for various printing methods. It is suited for not only oxidative polymerization type (solvent type) offset printing but also ultraviolet curable offset printing, relief printing, gravure printing, flexographic printing, letterpress printing and silk screen printing. Printed products can be obtained by printing the paper in the sheet form (sheetfed type) or in the roll form (take-up type).

(Application to Self-Adhesive Label)

The printing paper according to the present invention can be used as a label after disposing, on at least one side thereof, a self-adhesive layer. The kind or thickness (coating weight) of the self adhesive layer to be disposed on the printing paper can be selected from the kind of an adherend, using environment or intensity of adhesion or the like.

As ordinarily employed water-based or solvent-based adhesives, rubber adhesives, acrylic adhesives and silicone adhesives are representative. Specific examples of the rubber adhesives include polyisobutylene rubber, mixture thereof with butyl rubber, and mixtures obtained by adding, to such rubber adhesives, rosin abietate, terpene.phenol copolymer or terpene.indene copolymer. Examples of the acrylic adhesive include those having a glass transition point of −20° C. or less such as 2-ethylhexylacrylate.n-butyl acrylate copolymer, 2-ethylhexylacrylate.ethyl acrylate.methyl methacrylate copolymer.

Such synthetic polymer adhesives can be used as a solution in an organic solvent or a dispersion or emulsion in water. An adhesive containing a pigment such as titanium white also can be used in order to improve the opacity of the label.

The self-adhesive layer can be formed by applying the adhesive in the solution form onto a surface where the printing paper and release paper are bonded. The application is carried out using a die coater, bar coater, comma coater, lip coater, roll coater, gravure coater, spray coater, blade coater, reverse coater or air knife coater. If necessary, smoothing is performed, and after drying, the self-adhesive layer is formed.

It is the common practice to form the self-adhesive layer by applying an adhesive to release paper, dry the paper if necessary, and stacking printing paper over the self-adhesive layer, but the self-adhesive layer may be formed by applying the adhesive directly to printing paper.

The coating weight of the adhesive is not particularly limited, but usually ranges from 3 to 60 g/m$^2$, preferably from 10 to 40 g/m$^2$ in the solid content.

EXAMPLES

The present invention will hereinafter be described more specifically by Preparation Examples, Examples, Comparative Examples and Evaluation Examples.

Raw materials, using amounts, ratios and operations shown below can be changed as needed insofar as they do not depart from the scope of the present invention.

The scope of the present invention is therefore not limited to by the specific examples shown below.

Raw materials used in each Example and Comparative Example are shown in Table 1.

TABLE 1

| \multicolumn{2}{c}{(Preparation of aliphatic polyester resin)} | |
|---|---|
| Raw material | Detail |
| Aliphatic polyester 1 (Preparation Example 1) | A tertiary aliphatic polyester resin having a melting point of 110° C. (DSC peak temperature) which resin is obtained by dehydration polycondensation using succinic acid, 1,4-butanediol and DL-lactic acid as constituting units. |
| Aliphatic polyester 2 (Preparation Example 2) | A quaternary aliphatic polyester resin having a melting point of 90° C. (DSC peak temperature) which resin is obtained by dehydration polycondensation using succinic acid, adipic acid, 1,4-butanediol and DL-lactic acid as constituting units. |
| Aliphatic polyester 3 (Preparation Example 3) | L-Polylactic acid having a melting point of 170° C. (DSC peak temperature) and a weight average molecular weight of 20,000. |
| Talc | Fine talc powder having an average particle size of 4.6 μm ("MICRO ACE P-4", trade name; product of Nippon Talc) |
| Calcium carbonate | Heavy calcium carbonate having an average particle size of 1.5 μm and obtained by dry grinding ("Softon 1800", trade name; product of Shiraishi Calcium) |
| Titanium oxide | Rutile titanium dioxide having an average particle size of 0.2 μm ("TIPAQUE CR-60", trade name; product of Ishihara Sangyo) |

Preparation Example 1

A 600-liter reaction vessel equipped with a stirrer, a nitrogen gas inlet tube, a heater, a thermometer and an auxiliary agent inlet was charged with 7.43 kg of a 90 wt. % aqueous DL-lactic acid solution having 137 kg of succinic acid, 116 liter of 1,4-butanediol and 1 wt. % of germanium oxide dissolved therein in advance and 0.2 kg of "Super talc SG95" (product of Nippon Talc) as a nucleating agent, followed by polycondensation reaction for 2 hours at 120 to 220° C. in a nitrogen gas atmosphere. The temperature inside of the vessel then was raised and the introduction of nitrogen gas was terminated. Glycol removing reaction was performed for 5 hours under reduced pressure of 0.5 mmHg. The reaction mixture was extruded into strands in water and cut by a cutter. The aliphatic polyester resin thus obtained was white and its yield was 180 kg.

The aliphatic polyester resin (which will hereinafter be called "Aliphatic polyester 1") thus obtained had a melting point of 110° C. (peak temperature obtained by the DSC method and measured at a heating rate of 16° C./min under a nitrogen gas atmosphere), number average molecular weight (Mn) of 65,000 and weight average molecular weight of 150,000. The number average molecular weight was measured by gel permeation chromatography (GPC) ("HLC-8020" type GPC apparatus made by TOSOH, column: PLgel-5µ-MIS, polystyrene standards, solvent: chloroform). As a result of $^1$H-NMR analysis, the polymer had a lactic acid unit of 3.1 mole %, a succinic acid unit of 48.0 mole %, and a 1,4-butanediol unit of 48.9 mole %. The MFR as measured in accordance with JIS-K-7210 was 9.6 g/10 min.

Preparation Example 2

A similar reaction vessel to that used in Preparation Example 1 was charged with 7.43 kg of a 90% aqueous DL-lactic acid solution having 123 kg of succinic acid, 17 kg of adipic acid, 121 liter of 1,4-butanediol and 1 wt. % of germanium oxide dissolved therein in advance, 0.23 kg of trimethylolpropane and 0.2 kg of "Super Talc SG95" (product of Nippon Talc), followed by polycondensation reaction for 2 hours at 120 to 220° C. in a nitrogen gas atmosphere. The temperature inside of the container was then raised and the introduction of a nitrogen gas was terminated. Glycol removing reaction was then performed under reduced pressure of 0.5 mmHg. The reaction mixture was extruded into strands in water and then cut by a cutter. The aliphatic polyester resin thus obtained was white and its yield was 180 kg.

The aliphatic polyester resin (which will hereinafter be called "Aliphatic polyester 2") thus obtained had a melting point of 90° C., number average molecular weight (Mn) of 68,000 and weight average molecular weight of 173,000. As a result of $^1$H-NMR analysis, the polymer had a lactic acid unit of 3.3 mole %, a succinic acid unit of 43.3 mole %, an adipic acid unit of 4.8 mole % and a 1,4-butanediol unit of 48.6 mole %. Its MFR was 8.2 g/10 min.

Preparation Example 3

The polycondensation reaction of L-lactic acid was performed to yield L-polylactic acid (which will hereinafter be called "Aliphatic polyester 3") having a melting point of 170° C. and a weight average molecular weight of 200,000.

Example 1

A resin composition composed of 85 wt. % of Aliphatic polyester 1 obtained in Preparation Example 1, 14 wt. % of the talc as described in Table 1, and 1 wt. % of titanium oxide was stirred and mixed in a Henschel mixer. The resulting mixture was then melt kneaded by a twin-screw kneader ("NEXT-T60", product of Kobe Steel) into pellets.

The pellets thus obtained were melted in an extruder ("MK-40", product of Misuzuerie) having a cylinder temperature set at 180° C. and then extruded into a film from a T-die connected to the tip of the extruder. The film was cooled on a cooling roll, whereby the printing paper of the present invention was obtained.

The printing paper thus obtained has a thickness of 250 µm, density of 1.35 g/cm$^3$, surface area S of 12,900 µm$^2$, and a volume V, at the concave portion, of 5,400 µm$^3$, and a Gurley stiffness of 580 mg in the machine direction and 580 mg in the transverse direction. The printing paper was excellent in water resistance. These physical properties and evaluation on the printability of the printing paper are shown collectively in Table 2.

Examples 2 to 8, Comparative Examples 1 to 8

Printing paper was obtained in a similar manner to that employed in Example 1 by using a resin composition obtained by mixing Aliphatic polyester 1 obtained in Preparation Example 1 and the fine inorganic powders shown in Table 1 at a ratio shown in Table 2. Measurement results of the physical properties of them such as thickness, density, opacity, surface area S, volume V and Gurley stiffness are shown collectively in Table 2.

Example 9

In a similar manner to that employed in Example 7 except for the use of Aliphatic polyester 2 obtained in Preparation Example 2, printing paper was obtained. Measurement results of the physical properties of it are shown in Table 2.

Example 10

A resin composition composed of 85 wt. % of Aliphatic polyester obtained in Preparation Example 1, 14 wt. % of the talc shown in Table 1, and 1 wt. % of the titanium oxide described in Table 1 was stirred and mixed in a Henschel mixer. The resulting mixture was melt kneaded by a twin screw kneader ("NEXT-T60", product of Kobe Steel) into pellets.

The pellets thus obtained were melted in an extruder ("MK-40", product of Misuzuerie) having a cylinder temperature set at 180° C. and then extruded into a film from a T die connected to the tip of the extruder. The film was then cooled on a cooling roll to obtain an unstretched film. This film is different from that obtained in Example 1 in thickness.

After heating to 80° C., the unstretched film was stretched at a draw ratio of 4 in a machine direction between rolls having different circumferential speeds and then cooled, whereby the printing paper of the present invention was obtained. The printing paper thus obtained has a thickness of 125 µm, density of 1.03 g/cm$^3$, surface area S of 12,800 µm$^2$, and a volume V, at the concave portion, of 5,600 µm$^3$, a Gurley stiffness of 260 mg in the stretching direction and 190 mg in the transverse direction and a void ratio of 30%. The printing paper was light in weight so that it imposed a small burden on printing work and was excellent in water resistance. The results of the physical properties and evaluation on the printability of the printing paper are shown collectively in Table 3.

Examples 11 to 20, Comparative Examples 9 to 14

A film stretched uniaxially in the machine direction was obtained in a similar manner to that employed in Example 10 by using a resin composition obtained by mixing Aliphatic polyester 1 obtained in Preparation Example 1 with the fine inorganic powders as shown in Table 1 at a mixing ratio shown in Table 3. In Examples and Comparative Examples which will be described from now on, each of the film had a thickness adjusted to be as shown in Table 2 by changing the discharge amount from the extruder. The measurement results of physical properties of each film such as surface area S, volume V, Gurley stiffness and void ratio are shown collectively in Table 3.

Example 21

A film stretched uniaxially in the machine direction was obtained in a similar manner to that employed in Example 10 except that Aliphatic polyester 2 obtained in Preparation Example 2 was used and the stretching temperature was set at 60° C. The measurement results of the physical properties of the resulting uniaxially stretched film are shown in Table 3.

Examples 22, 23

After an unstretched film was obtained in a similar manner to Example 11, the resulting film was stretched at a draw ratio shown in Table 3, whereby a film stretched uniaxially in a machine direction was obtained. The measurement results of the physical properties of the uniaxially stretched film thus obtained are shown collectively in Table 3.

Comparative Example 15

A film stretched uniaxially in a machine direction was obtained in a similar manner to that employed in Example 11 except for the use of Aliphatic polyester 3 obtained in Preparation Example 3. The measurement results of the physical properties of the resulting uniaxially stretched film are shown in Table 3.

Comparative Example 16

After an unstretched film was obtained in a similar to that employed in Example 11, the film was stretched at a draw ratio (9) shown in Table 3 in order to obtain a film stretched uniaxially in a machine direction, which however failed in stable film formation owing to film breakage.

Examples 24, 25

Release paper having a thickness of 150 μm and density of 0.9 g/cm$^3$ was obtained by laminating a polyethylene film on both sides of high quality paper and then giving silicone treatment on one side of them. An acrylic adhesive ("Oribain BPS-1109", product of Toyo Ink) was applied to the silicone treated surface of the release paper to give a solid content of 25 g/m$^2$, followed by drying, whereby a self-adhesive layer was formed. The self-adhesive layer on the release paper was stacked over the printing paper obtained in Example 1 or Example 10 to prepare a self-adhesive label having the self-adhesive layer and release paper.

The self-adhesive label (Example 24) using, as a base, the printing paper obtained in Example 1 had a total thickness of 425 μm and Gurley stiffness of 2750 mg in the machine direction and 2760 mg in the transverse direction. Any of the running property on a printer, halftone dot reproducibility and picking, which will be described later, was evaluated as good.

Evaluation Example

Thickness

Thickness was measured in accordance with JIS-P-8118.
[Density]
Density was measured in accordance with JIS-P-8118.
[Gurley Stiffness]
Gurley stiffness was measured in accordance with JAPAN TAPPI Standard No. 40.
[Void Ratio]
The void ratio of a stretched film was calculated in accordance with the following equation (I) while using the above-described density.

$$\text{Void ratio (\%)} = [(\rho_0 - \rho)/\rho_0] \times 100 \quad (I)$$

(in the formula (I), $\rho_0$ represents the density of a film before stretching, while p represents the density of the film after stretching).
[Surface Area and Volume V of a Concave Portion]

A surface area S per 4,292 μm$^2$ of a projected area and a volume V, at the concave portion of the film surface, per 4,292 μm$^2$ of a projected area, of each of the printing papers of the present invention, were measured using a ultra-deep profile microscope ("VK-8550", trade name), product of Keyence Corporation at a resolution of 0.3 μm and magnification of 2,000 times (the volume V at the concave portion is a volume of a mountain portion assuming that the deepest valley portion parallel to the center plane is a base plane).

(Evaluation of Printability)
(Running Property on Offset Printer)

The running property of the printing paper on a printer when four-color sheetfed offset printing of a test pattern containing 50% halftone dots was performed on the surface side of the printing paper of the present invention by using oily offset printing ink ("Best SP Black, Indigo blue, Red, Yellow", trade name) manufactured by T&K TOKA and an offset four-color printer ("ROLAND 700", trade name) having a vacuum belt system feeder portion and manufactured by Man Roland was evaluated in accordance with the below-described criteria.

Good (A): Printing can be carried out stably at a printing rate of from 3,000 to 12,000 sheets/hour.

Slightly bad (B): A printing rate must be kept below 3,000 sheets/hour in order to carry out stable printing.

Bad (C): Printing cannot be carried out at all because the printer is terminated automatically by troubles such as multifeeding and uncontrollable movement of paper.

Printing paper that cannot be printed and therefore cannot be evaluated is indicated by (−) in Tables 2 and 3.

(Offset Printing Halftone Dot Reproducibility)

A 50% halftone dot portion of the printed matter obtained above was subjected to image processing by an image analyzer ("Luzex IID", trade name; product of NIRECO Corporation) connected to a stereoscopic microscope. The thickening ratio (dot gain) of the halftone dot was determined by calculation based on the actual area ratio of the halftone dot and halftone dot reproducibility was evaluated based on the below-described criteria. As the surface roughness, particularly, volume V at the concave portion is larger, the ink at the halftone dot flows therearound and the thickening ratio of the halftone dot increases. The printed matter therefore tends to have a blurred image while losing sharpness.

Good (A): Dot gain ranges from 15 to 25%.
Slightly bad (B): Dot gain exceeds 25% but not greater than 30%.
Bad (C): Dot gain undesirably exceeds 30%.

(Printing Sharpness)

A test pattern including image and character information was printed on the reverse side of the printed matter obtained above. After drying the ink, the penetration of the printed matter from the surface side was observed visually under indoor lighting and evaluated based on the following criteria:
Excellent (A): Neither the image nor character information on the reverse side can be discriminated.
Good (B): Neither image nor character information on the reverse side can be discriminated but change in color density can be perceived.
Bad (C): The image on the reverse side can be viewed through the image on the surface side and the character information can be read.

(Picking)

The printing paper obtained by stretching was printed as described above and the resulting printed matter was observed to visually confirm presence or absence of picking (picking or ink deprival at a solid printed portion with plural colors). In general, when the surface strength is smaller, picking tends to occur and disturb the formation of a good printed matter.

Good (A): Picking is not observed.
Bad (B): Picking is found.

[Surface Strength]

As the surface strength, in the present invention, of the printing paper obtained by stretching, adhesion strength of the film was measured by an adhesion strength measuring instrument ("Internal Bond Tester", trade name; product of Kumagai Riki Kogyo) after storage for 3 days under an atmosphere of temperature of 23° C. and relative humidity of 50%. The above-described adhesion strength is measured based on the following principle. An aluminum angle is fixed onto the upper surface of a specimen with a Cellophane tape attached on the film bonded surface. The lower surface is also fixed in a predetermined holder and a hammer is stuck from an angle of 90° to impact on the aluminum angle. The energy when the part of the specimen comes off is measured. The film having adhesion strength of 1.5 kg·cm or greater was regarded to meet the standard.

[Opacity]

The opacity in the present invention was measured in accordance with JIS-P-8136. Black and white standard plates were applied to the back surface of a specimen to be measured and the opacity was expressed as a ratio of the respective light reflectances (black plate/white plate) shown by percentage. As the opacity is lower, the penetration of light to the back surface of the paper increases, whereby the printed matter loses sharpness. The paper having an opacity of 85% or greater was regarded to have an acceptable quality and that having an opacity of 95% or greater is especially preferred.

TABLE 2

| Ex/Comp. Ex. | Raw material resin | Mixing ratio (wt. %) | Fine inorganic powders | Mixing ratio (wt. %) | Fine inorganic powder | Mixing ratio (wt.%) | Thickness (m) | Density (g/) |
|---|---|---|---|---|---|---|---|---|
| Ex. 1 | Aliphatic polyester 1 | 85 | Talc | 14 | Titanium oxide | 1 | 250 | 1.35 |
| Ex. 2 | Aliphatic polyester 1 | 70 | Talc | 29 | Titanium oxide | 1 | 260 | 1.44 |
| Ex. 3 | Aliphatic polyester 1 | 55 | Talc | 44 | Titanium oxide | 1 | 250 | 1.81 |
| Ex. 4 | Aliphatic polyester 1 | 45 | Talc | 54 | Titanium oxide | 1 | 240 | 2.05 |
| Comp. Ex. 1 | Aliphatic polyester 1 | 95 | Talc | 4 | Titanium oxide | 1 | 320 | 1.32 |
| Comp. Ex. 2 | Aliphatic polyester 1 | 35 | Talc | 64 | Titanium oxide | 1 | 250 | 2.19 |
| Comp. Ex. 3 | Aliphatic polyester 1 | 35 | Talc | 64 | Titanium oxide | 1 | 270 | 2.19 |
| Comp. Ex. 4 | Aliphatic polyester 1 | 85 | Talc | 14 | Titanium oxide | 1 | 100 | 1.35 |
| Ex. 5 | Aliphatic polyester 1 | 55 | Talc | 44 | Titanium oxide | 1 | 100 | 1.81 |
| Comp. Ex. 5 | Aliphatic polyester 1 | 70 | Talc | 29 | Titanium oxide | 1 | 370 | 1.44 |
| Ex. 6 | Aliphatic polyester 1 | 85 | Calcium carbonate | 14 | Titanium oxide | 1 | 480 | 1.37 |
| Ex. 7 | Aliphatic polyester 1 | 70 | Calcium carbonate | 29 | Titanium oxide | 1 | 440 | 1.48 |
| Ex. 8 | Aliphatic polyester 1 | 55 | Calcium carbonate | 44 | Titanium oxide | 1 | 420 | 1.82 |
| Comp. Ex. 6 | Aliphatic polyester 1 | 85 | Calcium carbonate | 14 | Titanium oxide | 1 | 120 | 1.37 |
| Comp. Ex. 7 | Aliphatic polyester 1 | 35 | Calcium carbonate | 64 | Titanium oxide | 1 | 490 | 2.2 |
| Comp. Ex. 8 | Aliphatic polyester 1 | 55 | Calcium carbonate | 44 | Titanium oxide | 1 | 510 | 1.82 |
| Ex. 9 | Aliphatic polyester 2 | 70 | Calcium carbonate | 29 | Titanium oxide | 1 | 480 | 1.42 |

| Ex/Comp. Ex. | Raw material resin | Surface roughness | | Gurley stiffness (MD/TD) (mg) | Running property on offset printer | Offset halftone reproducibility | Print sharpness | Opacity (%) |
|---|---|---|---|---|---|---|---|---|
| | | Surface area S (μm) | Volume V (μm³) | | | | | |

TABLE 2-continued

| | | | | | | | | |
|---|---|---|---|---|---|---|---|---|
| Ex. 1 | Aliphatic polyester 1 | 12,900 | 5,400 | 580/580 | A | A | B | 89 |
| Ex. 2 | Aliphatic polyester 1 | 22,700 | 9,800 | 1080/890 | A | A | B | 93 |
| Ex. 3 | Aliphatic polyester 1 | 29,600 | 14,300 | 1910/1040 | A | A | A | 96 |
| Ex. 4 | Aliphatic polyester 1 | 35,800 | 16,900 | 1890/1010 | A | A | A | 98 |
| Comp. Ex. 1 | Aliphatic polyester 1 | 4,800 | 1,800 | 850/910 | B | B | C | 54 |
| Comp. Ex. 2 | Aliphatic polyester 1 | 50,400 | 20,900 | 2410/1290 | A | C | A | 99 |
| Comp. Ex. 3 | Aliphatic polyester 1 | 49,800 | 20,500 | 3030/1620 | B | C | A | 99 |
| Comp. Ex. 4 | Aliphatic polyester 1 | 12,900 | 5,400 | 40/40 | B | A | C | 77 |
| Ex. 5 | Aliphatic polyester 1 | 29,600 | 14,300 | 100/60 | A | A | B | 85 |
| Comp. Ex. 5 | Aliphatic polyester 1 | 22,700 | 9,800 | 3120/2560 | C | — | — | 99 |
| Ex. 6 | Aliphatic polyester 1 | 5,400 | 2,600 | 2520/1830 | A | A | A | 95 |
| Ex. 7 | Aliphatic polyester 1 | 18,500 | 5,300 | 2040/2050 | A | A | A | 96 |
| Ex. 8 | Aliphatic polyester 1 | 24,000 | 12,700 | 1860/1630 | A | A | A | 98 |
| Comp. Ex. 6 | Aliphatic polyester 1 | 5,400 | 2,600 | 40/40 | B | A | C | 68 |
| Comp. Ex. 7 | Aliphatic polyester 1 | 32,300 | 18,900 | 3130/3120 | C | — | — | 99 |
| Comp. Ex. 8 | Aliphatic polyester 1 | 24,000 | 12,700 | 3330/3080 | C | — | — | 99 |
| Ex. 9 | Aliphatic polyester 2 | 12,400 | 8,100 | 1520/1580 | A | A | A | 96 |

TABLE 3

| Ex/ Comp. Ex. | Raw material resin | Mixing ratio (wt. %) | Fine inorganic powder | Mixing Ratio (wt. %) | Fine inorganic powder | Mixing ratio (wt. %) | Stretching conditions | Magnification (times) | Thickness (m) |
|---|---|---|---|---|---|---|---|---|---|
| Ex. 10 | Aliphatic polyester 1 | 85 | Talc | 14 | Titanium oxide | 1 | Machine-direction and uniaxial stretching | 4 | 125 |
| Ex. 11 | Aliphatic polyester 1 | 70 | Talc | 29 | Titanium oxide | 1 | Machine-direction and uniaxial stretching | 4 | 125 |
| Ex. 12 | Aliphatic polyester 1 | 55 | Talc | 44 | Titanium oxide | 1 | Machine-direction and uniaxial stretching | 4 | 125 |
| Ex. 13 | Aliphabc polyester 1 | 45 | Talc | 54 | Titanium oxide | 1 | Machine-direction and uniaxial stretching | 4 | 125 |
| Comp. Ex. 9 | Alphatic polyester 1 | 95 | Talc | 4 | Titanium oxide | 1 | Machine-direction and uniaxial stretching | 4 | 125 |
| Comp. Ex. 10 | Aliphatic polyester 1 | 35 | Tate | 64 | Titanium oxide | 1 | Machine-direction and uniaxial stretching | 4 | 125 |
| Ex. 14 | Alphatic polyester 1 | 85 | Calcium carbonate | 14 | Titanium oxide | 1 | Machine-direction and uniaxial stretching | 4 | 210 |
| Ex.15 | Aliphatic polyester 1 | 70 | Calcium carbonate | 29 | Titanium oxide | 1 | Machine-direction and uniaxial stretching | 4 | 210 |
| Ex. 16 | Aliphatic polyester 1 | 55 | Calcium carbonate | 44 | Titanium oxide | 1 | Machine-direction and uniaxial stretching | 4 | 210 |
| Comp. Ex. 11 | Aliphatic polyester 1 | 35 | Calcium carbonate | 84 | Titanium oxide | 1 | Machine-direction and uniaxial stretching | 4 | 210 |
| Comp. Ex. 12 | Aliphatic polyester 1 | 70 | Talc | 29 | Titanium oxide | 1 | Machine-direction and uniaxial stretching | 4 | 80 |
| Ex. 17 | Aliphatic polyester 1 | 70 | Talc | 29 | Titanium oxide | 1 | Machine-direction and uniaxial stretching | 4 | 100 |
| Ex. 18 | Aliphatic polyester 1 | 70 | Talc | 29 | Titanium oxide | 1 | Machine-direction and uniaxial stretching | 4 | 280 |
| Comp. Ex. 13 | Aliphatic polyester 1 | 70 | Talc | 29 | Titanium oxide | 1 | Machine-direction and uniaxial stretching | 4 | 300 |
| Comp. Ex. 14 | Aliphatic polyester 1 | 70 | Calcium carbonate | 29 | Titanium oxide | 1 | Machine-direction and uniaxial stretching | 4 | 100 |
| Ex. 19 | Aliphatic polyester 1 | 70 | Calcium carbonate | 29 | Titanium oxide | 1 | Machine-direction and uniaxial stretching | 4 | 125 |
| Ex. 20 | Aliphatic polyester 1 | 70 | Calcium carbonate | 29 | Titanium oxide | 1 | Machine-direction and unaxial stretching | 4 | 900 |

TABLE 3-continued

| Ex/Comp. Ex. | | | | | | | | | | | | | |
|---|---|---|---|---|---|---|---|---|---|---|---|---|---|
| Ex. 21 | Aliphatic polyester 2 | 85 | Talc | 14 | Titanium oxide | 1 | Machine-direction and uniaxial stretching | 4 | 210 | | | | |
| Comp. Ex. 15 | Aliphatic polyester 3 | 70 | Talc | 29 | Titanium oxide | 1 | Machine-direction and uniaxial stretching | 2 | 175 | | | | |
| Ex. 22 | Aliphatic polyester 1 | 70 | Talc | 29 | Titanium oxide | 1 | Machine-direction and uniaxial stretching | 1.5 | 125 | | | | |
| Ex. 23 | Aliphatic polyester 1 | 70 | Talc | 29 | Titanium oxide | 1 | Machine-direction and uniaxial stretching | 6 | 125 | | | | |

| Ex/Comp. Ex. | Density (g/) | Surface roughness Surface area S | Surface roughness Volume V | Gurley stiffness (MD/TD) (mg) | Running property on offset printer | Offset halftone reproducibility | Print sharpness | Opacity (%) | Porosity (%) | Surface strength (kg·cm) | Presence or absence of picking |
|---|---|---|---|---|---|---|---|---|---|---|---|
| Ex. 10 | 1.03 | 12,800 | 5,800 | 280/190 | A | A | A | 95 | 30 | 2.5 | ○ |
| Ex. 11 | 0.91 | 22,800 | 9,900 | 240/140 | A | A | A | 98 | 46 | 2.1 | ○ |
| Ex. 12 | 0.88 | 29,700 | 14,800 | 170/90 | A | A | A | 99 | 54 | 1.8 | ○ |
| Ex. 13 | 0.84 | 38,000 | 18,600 | 110/50 | A | A | A | 99 | 59 | 1.5 | ○ |
| Comp. Ex. 9 | 1.28 | 7,800 | 1,600 | 250/210 | B | B | C | 37 | 4 | 2.8 | ○ |
| Comp. Ex. 10 | 0.83 | 45,000 | 23,900 | 80/40 | B | C | A | 99 | 62 | 1.3 | x |
| Ex. 14 | 1.33 | 9,800 | 2,900 | 780/880 | A | A | B | 89 | 8 | 2.6 | ○ |
| Ex. 15 | 1.35 | 20,500 | 5,300 | 430/380 | A | A | B | 84 | 20 | 2.2 | ○ |
| Ex. 16 | 1.32 | 28,200 | 13,000 | 80/80 | A | A | A | 98 | 31 | 1.7 | ○ |
| Comp. Ex. 11 | 1.32 | 50,500 | 21,200 | 40/30 | B | C | A | 99 | 40 | 1.2 | x |
| Comp. Ex. 12 | 0.78 | 22,800 | 9,900 | 60/40 | B | A | A | 96 | 46 | 2.0 | ○ |
| Ex. 17 | 0.78 | 22,800 | 9,900 | 120/70 | A | A | A | 97 | 46 | 2.1 | ○ |
| Ex. 18 | 0.78 | 22,800 | 9,900 | 2690/1620 | A | A | A | 99 | 46 | 2.0 | ○ |
| Comp. Ex. 13 | 0.78 | 22,800 | 9,900 | 3310/2000 | C | — | — | 99 | 46 | 2.1 | — |
| Comp. Ex. 14 | 1.25 | 20,500 | 5,300 | 50/40 | B | A | B | 88 | 16 | 2.1 | ○ |
| Ex. 19 | 1.25 | 20,500 | 5,300 | 90/80 | A | A | B | 90 | 16 | 2.0 | ○ |
| Ex. 20 | 1.25 | 20,500 | 5,300 | 1260/1090 | A | A | A | 99 | 16 | 2.0 | ○ |
| Ex. 21 | 0.88 | 11,400 | 7,400 | 540/410 | A | A | A | 96 | 37 | 3.0 | ○ |
| Comp. Ex. 15 | 1.49 | 24,100 | 11,500 | 4330/3010 | C | — | — | 93 | 12 | 2.5 | — |
| Ex. 22 | 1.54 | 10,400 | 6,300 | 260/200 | A | A | B | 88 | 9 | 3.1 | ○ |
| Ex. 23 | 0.73 | 33,900 | 16,100 | 250/150 | A | A | A | 99 | 57 | 1.5 | ○ |

INDUSTRIAL APPLICABILITY

The printing paper of the present invention is excellent in running stability on a printer, substrate strength, halftone dot reproducibility, printing sharpness and water resistance and is therefore suited for use in sheetfed/surface offset printing, for example, commercial printing of outside posters, maps, catalogues, menus, brochures, and labels.

The invention claimed is:

1. A printing paper, which comprises an aliphatic polyester resin composition comprising:
   (a) from 40 to 90 wt. % of an aliphatic polyester resin containing at least an aliphatic diol unit represented by the following formula (I) and an aliphatic dicarboxylic acid unit represented by the following formula (II); and
   (b) from 60 to 10 wt. % of fine talc powder,
   wherein the printing paper has a Gurley stiffness of from 50 to 3,000 mg, a thickness of 120 to 400 μm, a surface area S of from 5,000 to 50,000 μm² per 4,292 μm² of a projected area on the surface of the printing paper, and a volume V, at a convex portion on the surface of the printing paper, of from 2,000 to 20,000 μm³ per 4,292 μm² of a projected area on the surface of the printing paper

  (I)

(m represents an integer of from 2 to 10)

  (II)

(n represents an integer of from 1 to 12).

2. The printing paper according to claim 1, wherein the aliphatic polyester resin (a) further comprises an aliphatic oxycarboxylic acid unit represented by the following formula (III):

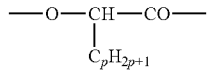  (III)

(p represents 0 or an integer of from 1 to 10).

3. The printing paper according to claim 2, wherein the aliphatic polyester resin (a) comprises from 38.5 to 50 mole % of the aliphatic diol unit represented by the formula (I), from 38.5 to 50 mole % of the aliphatic dicarboxylic acid unit represented by the formula (II), and from 0 to 23 mole % of the aliphatic oxycarboxylic acid unit represented by the formula (III), and has a number average molecular weight of from 10000 to 500000.

4. The printing paper according to claim 1, wherein at least one selected from the group consisting of ethylene glycol, 1,3-propanediol, 1,4-butanediol, 1,5-pentanediol, 1,6-hexanediol, 1,8-octanediol, decamethylene glycol, and neopentyl glycol is a source for the aliphatic diol unit.

5. The printing paper according to claim 1, wherein at least one selected from the group consisting of oxalic acid, malonic acid, succinic acid, glutaric acid, adipic acid, pimelic acid, suberic acid, azelaic acid, sebacic acid, undecadicarboxylic acid, dodecadicarboxylic acid hexahydrophthalic acid, hexahydroisophthalic acid, hexahydroterephthalic acid, and ester and anhydride derivatives thereof, is a source for the aliphatic dicarboxylic acid unit.

6. The printing paper according to claim 1, wherein 1,4-butanediol is a source for the aliphatic diol unit and at least one selected from the group consisting of succinic acid, adipic acid, and ester and anhydride derivatives thereof, is a source for the aliphatic dicarboxylic acid unit.

7. The printing paper according to claim 2, wherein at least one selected from the group consisting of lactic acid, glycolic acid, 2-hydroxy-n-butyric acid, 2-hydroxy-3-methyl-n-butyric acid, 2-hydroxy-3,3-dimethyl-n-butyric acid, 3-hydroxy-n-butyric acid, 4-hydroxy-n-butyric acid, 2-hydroxy caproic acid, 2-hydroxy-n-valeric acid, 3-hydroxy-n-valeric acid, 4-hydroxy-n-valeric acid, 5-hydroxy-n-valeric acid, 2-hydroxy n-hexanoic acid, 2-hydroxy-1-n-hexanoic acid, 3-hydroxy-n-hexanoic acid, and 4-hydroxy-n-hexanoic acid is a source for the aliphatic oxycarboxylic acid unit.

8. The printing paper according to claim 2, wherein lactic acid is a source for the aliphatic oxycarboxylic acid unit.

9. The printing paper according to claim 1, wherein the fine talc powders (b) have an average particle size of 30 μm or less.

10. The printing paper according to claim 1, wherein the fine talc powders (b) have an average particle size of 10 μm or less.

11. The printing paper according to claim 1, wherein the fine talc powders (b) have an average particle size of 0.2 to 5 μm.

12. The printing paper according to claim 1, wherein the resin composition further comprises at least one selected from the group consisting of calcium carbonate and titanium oxide.

13. The printing paper according to claim 1, wherein the resin composition further comprises at least one selected from the group consisting of plasticizer, heat stabilizer, antioxidant, ultraviolet absorber, dye, pigment, fluorescence agent, lubricant, flame retardant and nucleating agent.

14. The printing paper according to claim 1, which is in the form of an unstretched film comprising the aliphatic polyester resin composition.

15. The printing paper according to claim 1, which is in the form of a uniaxially stretched film comprising the aliphatic polyester resin composition.

16. The printing paper according to claim 1, which is in the form of a biaxially stretched film comprising the aliphatic polyester resin composition.

17. The printing paper according claim 1, which has a property of being printed stably at a printing speed of from 3,000 to 12,000 sheets/hour in sheetfed offset printing.

18. The printing paper according to claim 1, which exhibits a thickening ratio (dot gain) of a 50% halftone dot portion in the offset printing matter that falls within a range of from 15 to 25%.

19. The printing paper according to claim 1, which has a property of being free from picking in the printing matter when printed.

20. The printing paper according to claim 1, which exhibits a surface strength of 1.5 kg·cm or greater.

21. The printing paper according to claim 1, which has an opacity of 85% or greater.

22. The printing paper according to claim 1, which is in the form of a stretched film that has a void ratio, represented by the formula (IV), of from 5 to 60%

$$\text{void ratio (\%)} = [\rho_0 - \rho]/\rho \times 100 \qquad \text{(IV)}$$

($\rho_0$ represents a density of the film before stretching and $\rho$ represents a density of the film after stretching).

23. A multilayer printing laminate, comprising the printing paper according to claim 1 as at least one layer of the laminate.

24. A label, comprising the printing paper according to claim 1 and an adhesive layer provided on at least one surface of the printing paper, wherein the adhesive layer comprises at least one selected from the group consisting of rubber adhesives, acrylic adhesives, and silicone adhesives.

25. A printed label, comprising the label according to claim 24 and printed material on at least one surface of the printing paper.

26. A printed item, comprising the printing paper according to claim 1 and material printed on at least one surface of the printing paper.

27. A method of forming a printed item, comprising printing material on at least one surface of a printing paper according to claim 1.

28. The method according to claim 27, wherein the printing is offset printing.

* * * * *